UNITED STATES PATENT OFFICE 2,481,674

4-(2-PYRRYL) THIAZOLES AND 4-(2-PYRRYL) SELENAZOLES

Edward B. Knott, Frances M. Hamer, and Russell J. Rathbone, Harrow, Wealdstone, England, assignors to Eastman Kodak Company, Rochester, N. Y., a corporation of New Jersey No Drawing. Application February 7, 1946, Serial No. 646,208. In Great Britain March 1, 1945

10 Claims. (Cl. 260—298)

This invention relates to 4-(2-pyrryl) thiazoles and 4-(2-pyrryl) selenazoles, to a process for preparing the same, to quaternary salts prepared from the said thiazoles and selenazoles, and to dyes prepared from said quaternary salts.

It is known that 2-methyl-4-(2-thienyl) thiazole can be prepared by halogenating methyl 2-thienyl ketone and condensing the resulting halogenomethyl 2-thienyl ketone with thioacetamide. We have now found that 2-substituted 4-(2-pyrryl) thiazoles and 2-substituted 4-(2-pyrryl) selenazoles, which differs essentially from the known 4-(2-thienyl) thiazoles, can be prepared by condensing a halogenated 2-pyrryl ketone with a thioamide or a selenoamide which contains a

group (or a

group depending upon whether the thioamide and selenoamide structures are viewed as:

and

or are viewed as:

and

Actually either structure can be employed to represent the amides and the two forms are probably in equilibrium with one another).

It is, accordingly, an object of our invention to provide 2-substituted-4-(2-pyrryl) thiazoles and 2-substituted - 4 - (2-pyrryl) selenazoles and a process for preparing the same. A further object is to provide quaternary salts prepared from such thiazoles and selenazoles and to provide dyes prepared from such quaternary salts. Other objects will become apparent hereinafter.

In accordance with our invention, we prepare 2-substituted-4-(2-pyrryl) thiazoles and 2-substituted -4-(2-pyrryl) selenazoles by condensing an amide selected from the group consisting of thioamides containing a

group and selenoamides containing a

group, with a ketone selected from the group consisting of those represented by the following general formula:

I. 

wherein R represents a 2-pyrryl group, $R_1$ represents a member selected from the group consisting of a hydrogen atom, an alkyl group, an aralkyl group and an aryl group.

The condensation proceeds according to the following chemical equation:

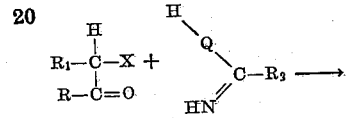

II. 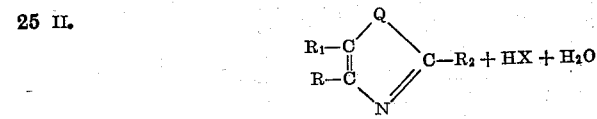

wherein R, $R_1$ and X have the values given above, Q represents a member selected from the group consisting of a sulfur atom and a selenium atom, and $R_2$ represents a member selected from the group consisting of an amino group, an alkylamino group, an aralkylamino, an arylamino group, an alkyl group, an aralkyl group, and an aryl group.

Examples of the thioamides and selenoamides are: thioacetamide, selenoacetamide, thiourea, phenylthiourea, thiopropionamide, thiobenzamide, methylthiourea, benzylthiourea, thiophenylacetamide, etc.

Examples of the halogenated ketones are: 2-chloroacetyle-pyrrole, 2-bromoacetylpyrrole, 2-iodacetylpyrrole, 2-(α-choloropropionyl) pyrrole, 2-(phenylchloroacetyl) pyrrole, 2- (α-chloro-β-phenylpropionyl) pyrrole, etc.

The condensation is advantageously effected in a solvent, e. g. an alcohol, such as methyl, ethyl, isopropyl, n-propyl, isobutyl, n-butyl alcohols, etc. Equimolecular proportions of the ketone and amide are advantageously employed. The reaction takes place rapidly at elevated temperatures and may be accelerated by the addition of alkalies, e. g. alkali carbonates or bicarbonates (sodium or potassium carbonate or bicarbonate for example).

The following examples will serve to illustrate further the manner of practicing our invention.

*Example 1.—2-amino-4-(2-pyrryl) thiazole.*

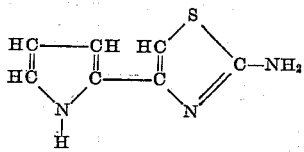

Thiourea (1.52 g.), 2-chloroacetylpyrrole (2.87 g.) and ethyl alcohol (10 cc.) were refluxed for 15 minutes. On cooling, the hydrohalide of the above-formulated base crystallized. Diethyl ether was added and then the crystalline hydrohalide was collected on a filter. Recrystallized from ethyl alcohol, the hydrohalide formed glistening flat needles containing alcohol of crystallization and melting about 200° C. with decomposition. The alcohol of crystallization is lost upon standing. The hydrohalide was dissolved in hot water and the free base was precipitated with aqueous sodium bicarbonate. Recrystallized from hot water, the free base formed creamy glistening needles melting at 160° C.

*Example 2.—2-methyl-4-(2-pyrryl) thiazole*

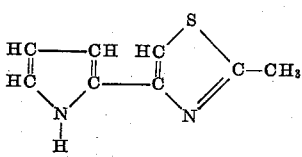

Thioacetamide (1.5 g.), 2-chloroacetylpyrrole (2.87 g.) and ethyl alcohol (10 cc.) were refluxed to form a solution, and anhydrous potassium carbonate (2 g.) was added to the solution. The whole was then refluxed for 30 minutes, shaking so that the color remained yellow. Upon dilution of the mixture with water, the above-formulated base precipitated as an oil which soon solidified. After 2 hours, it was collected and recrystallized from methanol. It formed colorless glassy aggregates melting at 94 to 95° C. It can also be purified by distillation (B. P. 171° C. at 18 mm. of Hg pressure) or by steam distillation.

In a manner similar to that illustrated in the foregoing examples, 2 - methyl - 4 - (2 - pyrryl) selenazole can be prepared from seleoacetamide and 2-chloroacetylpyrrole; 2-ethyl-4-(2-pyrryl)-thiazole can be prepared from thiopropionamide and 2-chloroacetylpyrrole; 2-phenyl-4-(2-pyrryl) thiazole can be prepared from thiobenzamide and 2-chloroacetylpyrrole, etc.

The halogenated 2-pyrryl ketones employed in practicing our invention can be prepared according to the method described by Blick, Faust, Gearien and Warznski, J. Am. Chem. Soc. 65, 2465 (1943) e. g. 2-chloroacetylpyrrole can be formed from pyrrole and chloroacetonitrile, or the halogenated 2-pyrryl ketones can be prepared according to the method described by Oddo and Machini, Gazz. chim. ital. (2) 42, 260 (1912).

We have also found that the heterocyclic bases of our invention can be converted to quaternary salts of the following general formula:

III.

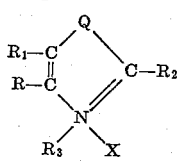

wherein R, R₁, R₂ and Q have the values given above, and R₃ represents an alkyl or aralkyl group and X represents an anion. Such quaternary salts are formed by heating the bases with an alkyl or aralkyl salt, e. g. methyl-p-toluenesulfonate, ethyl-p-toluenesulfonate, methyl benzenesulfonate, ethyl iodide, n-propyl bromide, benzylchloride, dimethyl sulfate, diethyl sulfate, etc.

The following example will serve to illustrate further the preparation of such quaternary salts.

*Example 3.—2-methyl-4-(2-pyrryl) thiazole etho-p-toluenesulfonate*

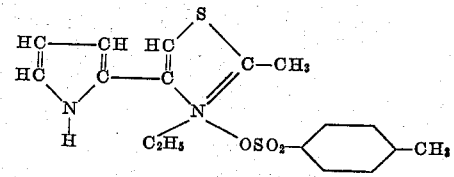

2-methyl-4-(2-pyrryl) thiazole (3.3 g., 1 mol.) and ethyl-p-toluenesulfonate (4.03 g., 1 mol.) were heated together in an oil bath at 120° C. for 2 hours. More ethyl-p-toluenesulfonate (4.03 g., 1 mol.) was then added and heating at 120° C. was continued for a further 3 hours. The resultant thick oil was purified by washing with absolute diethyl ether.

In a similar manner, other alkyl salts, e. g. those mentioned above, can be heated with the bases to give quaternary salts, using a sealed tube where the alkyl salt is too volatile to be used in an open vessel.

The quaternary salts of the following general formula:

IV.

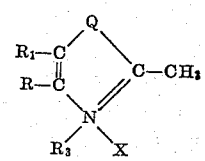

wherein R, R₁, R₃, Q and X have the values given above can be condensed with cyclammonium quaternary salts containing in the α- or γ-position (i. e. one of the so-called reactive positions) a thioether group or a selenoether group, to give monomethine cyanine salts (or dyes). The condensations are advantageously effected in the presence of a basic condensing agent, e. g. a tertiary amine (triethylamine, triamylamine, N-methylpiperidine, dimethylaniline, etc.) or an alkali metal carbonate (sodium or potassium carbonate). The following examples will serve to illustrate further the preparation of such cyanine salts which are represented by the following general formula:

V.

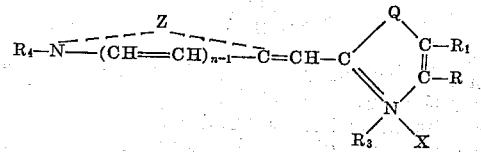

wherein R, R₁, R₃, Q and X have the values given above, and $n$ represents a positive integer of from 1 to 2, R₄ represents an alkyl or aralkyl group, and Z represents the non-metallic atoms necessary to complete a heterocyclic nucleus containing from 5 to 6 atoms in the heterocyclic ring, e. g. a heterocyclic nucleus of the thiazole series (for instance thiazole, 4-methylthiazole, 4-phenylthiazole, 4-(2-thienyl) thiazole, benzothiazole, 5-chlorobenzothiazole, α-naphthothiazole, β-naphthothiazole, etc.), a heterocyclic nucleus of the oxazole series (for instance 4-methyloxazole, 4-phenyloxazole, benzoxazole, 5-phenylbenzoxazole, α-naphthoxazole, β-naphthoxazole, etc.), a heterocyclic nucleus of the selenazole series (for instance 4-methylselenazole, 4-phenylselenazole, benzoselenazole, α-naphthoselenazole, β-naphthoselenazole, etc.), a heterocyclic nucleus of the thiazoline series, a heterocyclic nucleus of the quinoline series (for instance quinoline, 6,7-dimethyl quinoline, etc.), a heterocyclic nucleus of the indolenine series, for instance 3,3-dimethylindolenine, etc.

*Example 4.—[2-(1 - ethylquinoline)] - [2-{4-(2-pyrryl)-3-ethylthiazole}] - methinecyanine iodide*

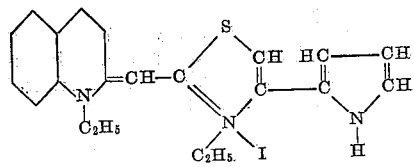

2-methyl-4-(2-pyrryl)thiazole etho-p-toluenesulfonate (3.63 g., 1 mol.), 2-ethylthioquinoline etho-p-toluenesulfonate (3.89 g., 1 mol.), triethylamine (2.75 cc., 2 mol.) and ethyl alcohol (20 cc.) were boiled and stirred together for 3 minutes. The hot solution was poured into a hot solution of potassium iodide (6.6 g., 4 mols.) in water (20 cc.). A tar precipitated and solidified on cooling. It was filtered off, washed with water and with diethyl ether, and then recrystallized from methyl alcohol (60 cc.). After a second recrystallization from methyl alcohol, the reddish brown crystals of the above-formulated cyanine iodide had a melting point of 227° C. with decomposition. Its methyl alcoholic solution had an absorption maximum at 479 mu. The cyanine iodide sensitized a gelatino-silver-bromiodide photographic emulsion with a maximum at 535 mu and a gelatino-silver-chloride photographic emulsion with a maximum at 520 mu.

*Example 5.—[2-{3-ethyl-4-(2-pyrryl)thiazole}]-[2-(3 - ethylbenzothiazole)] - methinecyanine iodide*

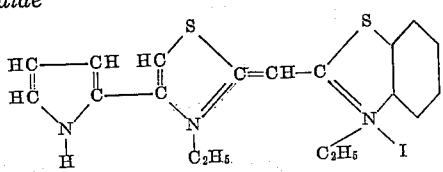

2-methyl-4-(2-pyrryl)-2-methylthiazole etho-p-toluenesulfonate (3.63 g., 1 mol.), 2-ethylthiobenzothiazole etho-p-toluenesulfonate (3.96 g., 1 mol.), triethylamine (2.75 cc., 2 mols.) and ethyl alcohol (20 cc.) were boiled and stirred together for 3 minutes. The hot solution was poured into a hot solution of potassium iodide (6.6 g., 4 mols.) in water (20 cc.). When cooled, the solid cyanine iodide formulated above was filtered off, and washed with water and with diethyl ether. It was recrystallized from methyl alcohol (150 cc.). The resulting dull yellow crystals melted at 262° C. with decomposition. A methyl alcohol solution of the crystals had an absorption maximum at 417 mu. The cyanine iodide sensitized a photographic gelatino-silver-chloride emulsion with a maximum at 470–480 mu.

In a similar manner other of our new quaternary salts represented by Formula IV above can be condensed with cyclammonium quaternary salts containing a thioether or selenoether (e. g. methylthio, ethylthio, benzylthio, phenylthio, ethylseleno, etc.) group in the α- or γ-position.

Our new quaternary salts which are represented by Formula IV above can also be condensed with a trialkylorthoformate to give symmetrical trimethinecyanine salts (or dyes). The condensations are advantageously carried out in the presence of a basic condensing agent, e. g. pyridine, triethylamine, etc. The following example will serve to illustrate further the preparation of the trimethinecyanine salts which are represented by the following general formula:

VI.

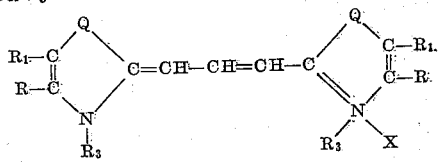

wherein R, R₁, R₃, Q and X represent the values given above.

*Example 6.—Bis-2-[3-ethyl-4-(2-pyrryl)thiazole]-trimethinecyanine iodide.*

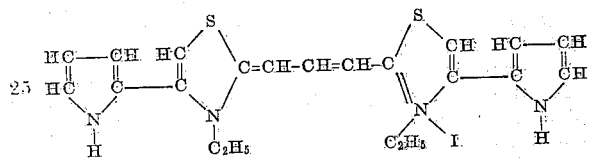

2-methyl-4-(2-pyrryl)thiazole (3.28 g., 2 mols.) and ethyl p-toluenesulfonate (4 g., 2 mols.) were heated together in an oil bath at 120–140° C. for 6 hours. The product was dissolved in hot pyridine (30 ccs.), treated with ethyl orthoformate (5 cc., 3 mols.), and the mixture heated under reflux for one hour. The hot solution was poured into a hot solution of potassium iodide (6.7 g., 4 mols.) in water (30 cc.). A purple tar precipitated and it solidified upon grinding with cold water. It was recrystallized from methyl alcohol (20 cc.). The resulting black crystals melted at 199–202° C. with decomposition. Their methyl alcohol solution had its absorption maximum at 555 mu. The cyanine salt sensitized a gelatino-silver-bromide photographic emulsion up to 640 mu with a flat maximum between 570 and 620 mu.

In a similar manner bis-2-[3-methyl-4-(2-pyrryl)thiazole]-trimethinecyanine iodide can be prepared from 2 - methyl-4-(2-pyrryl)-thiazole metho-p-toluenesulfonate; bis-2-[3-propyl-4-(2-pyrryl)-thiazole]-trimethinecyanine iodide from 2 - methyl-4-(2-pyrryl) - thiazole propo-p-toluenesulfonate, etc.

Our new quaternary salts which are represented by Formula IV above can also be condensed with diarylformamidines, e. g. diphenylformamidine, with an alkyl isoformanilide or with an alkylisothioformanilide, e. g. methylisothioformanilide, to give β-arylaminovinyl derivatives or trimethinecyanine salts. With equimolecular proportions of the quaternary salts and diphenylformamidine, an alkylisoformanilide or an alkylisothioformanilide, β-arylaminovinyl derivatives of the following general formula are obtained:

VII.

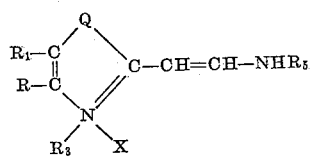

wherein Q, R, R₁, R₃ and X have the values given above, and R₅ represents an aryl group. With a β-arylaminovinyl derivative of Formula VII, our new quaternary salts condense, in the presence of an acid-binding agent, e. g., triethylamine or piperidine, to give the trimethinecyanine salt defined by Formula VI.

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proven satisfactory as a solvent for our new dyes. Acetone may also be employed where the solubility of the dyes in methanol is lower than desired.

Sensitization by means of our new dyes is, of course, directed primarily to the ordinarily employed gelatino-silver-halide developing-out emulsions. The dyes or advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which includes most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

What we claim as our invention and desire to be secured by Letters Patent of the United States is:

1. A process for preparing a 4-(2-pyrryl)azole comprising condensing an amide selected from the group consisting of amides represented by the following general formula:

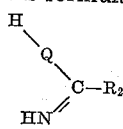

wherein Q represents an atom selected from the group consisting of a sulfur and a selenium atom, and $R_2$ represents a member selected from the group consisting of an amino group, an alkylamino group, an aralkylamino group, an arylamino group, an alkyl group, an aralkyl group and an aryl group, with a ketone selected from those represented by the following general formula:

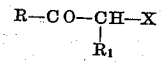

wherein R represents a 2-pyrryl group, $R_1$ represents a member selected from the group consisting of a hydrogen atom, an alkyl group, an aralkyl group and an aryl group, and X represents a halogen atom selected from the group consisting of a chlorine atom, a bromine atom and an iodine atom.

2. A process for preparing a 4-(2-pyrryl)thiazole comprising condensing a thioamide selected from the group of thioamides represented by the following general formula:

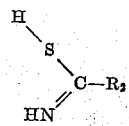

wherein $R_2$ represents a member selected from the group consisting of an amino group, an alkylamino group, an aralkylamino group, an arylamino group, an alkyl group, an aralkyl group and an aryl group, with a ketone selected from those represented by the following general formula:

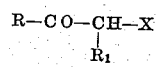

wherein R represents a 2-pyrryl group, $R_1$ represents a member selected from the group consisting of a hydrogen atom, an alkyl group, an aralkyl group and an aryl group, and X represents a halogen atom selected from the group consisting of a chlorine atom, a bromine atom and an iodine atom.

3. A process for preparing a 4-(2-pyrryl)thiazole comprising condensing a thioamide selected from the group of thioamides represented by the following general formula:

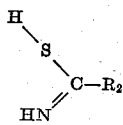

wherein $R_2$ represents a member selected from the group consisting of an amino group, an alkylamino group, an aralkylamino group, an arylamino group, an alkyl group, an aralkyl group and an aryl group, with a ketone selected from those represented by the following general formula:

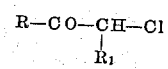

wherein R represents a 2-pyrryl group and $R_1$ represents a member selected from the group consisting of a hydrogen atom, an alkyl group, an aralkyl group and an aryl group.

4. A process for preparing 2-amino-4-(2-pyrryl)thiazole comprising condensing thiourea with 2-chloracetylpyrrole.

5. A process for preparing 2-methyl-4-(2-pyrryl)thiazole comprising condensing thioacetamide with 2-chloroacetylpyrrole.

6. A process for preparing 2-methyl-4-(2-pyrryl)thiazole comprising condensing, in the presence of an alkali metal salt selected from the group consisting of alkali metal carbonates and alkali metal bicarbonates, thioacetamide with 2-chloroacetylpyrrole.

7. The 4-(2-pyrryl)azoles which are represented by the following general formula:

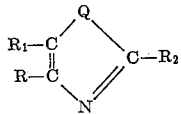

wherein R represents a 2-pyrryl group, $R_1$ represents a member selected from the group consisting of a hydrogen atom, an alkyl group, an aralkyl group and an aryl group, $R_2$ represents a member selected from the group consisting of an amino group, an alkylamino group, an aralkylamino group, an arylamino group, an alkyl group, an aralkyl group and an aryl group, and Q represents a member selected from the group consisting of a sulfur atom and a selenium atom.

8. The 4-(2-pyrryl)thiazoles which are represented by the following general formula:

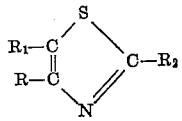

wherein R represents a 2-pyrryl group, $R_1$ represents a member selected from the group consisting of a hydrogen atom, an alkyl group, an aralkyl group and an aryl group, and $R_2$ represents a member selected from the group consisting of an amino group, an alkylamino group, an aralkylamino group, an arylamino group, an alkyl group, an aralkyl group and an aryl group.

9. 2-amino-4-(2-pyrryl)thiazole.
10. 2-methyl-4-(2-pyrryl)thiazole.

EDWARD B. KNOTT.
FRANCES M. HAMER.
RUSSELL J. RATHBONE.

REFERENCES CITED

The following references are of record in the file of this patent:

UNITED STATES PATENTS

| Number | Name | Date |
|---|---|---|
| 2,213,986 | Kendall | Sept. 10, 1940 |
| 2,304,112 | Middleton | Dec. 8, 1942 |
| 2,423,709 | Knott | July 8, 1947 |

OTHER REFERENCES

Richter's "Organic Chemistry," vol. 3, pp. 12–38.

Certificate of Correction

Patent No. 2,481,674 September 13, 1949

EDWARD B. KNOTT ET AL.

It is hereby certified that errors appear in the printed specification of the above numbered patent requiring correction as follows:

Column 2, line 44, for "chloroacetyle-pyrrole" read *chloroacetyl-pyrrole*; line 45, for "iodacetylpyrrole" read *iodoacetylpyrrole*; column 3, line 49, for "seleoacetamide" read *selenoacetamide*;

and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*